US011872651B2

United States Patent
Fujii et al.

(10) Patent No.: US 11,872,651 B2
(45) Date of Patent: Jan. 16, 2024

(54) DISSIMILAR MATERIAL SOLID PHASE BONDING METHOD, DISSIMILAR MATERIAL SOLID PHASE BONDED STRUCTURE, AND DISSIMILAR MATERIAL SOLID PHASE BONDING DEVICE

(71) Applicant: OSAKA UNIVERSITY, Suita (JP)

(72) Inventors: Hidetoshi Fujii, Suita (JP); Yoshiaki Morisada, Suita (JP); Yasuhiro Aoki, Suita (JP); Masayoshi Kamai, Suita (JP)

(73) Assignee: OSAKA UNIVERSITY, Suita (JP)

( * ) Notice: Subject to any disclaimer, the term of this patent is extended or adjusted under 35 U.S.C. 154(b) by 0 days.

(21) Appl. No.: 17/775,421

(22) PCT Filed: Oct. 28, 2020

(86) PCT No.: PCT/JP2020/040395
§ 371 (c)(1),
(2) Date: May 9, 2022

(87) PCT Pub. No.: WO2021/095528
PCT Pub. Date: May 20, 2021

(65) Prior Publication Data
US 2022/0371120 A1 Nov. 24, 2022

(30) Foreign Application Priority Data
Nov. 12, 2019 (JP) .................................. 2019-204361

(51) Int. Cl.
*B23K 20/00* (2006.01)
*B23K 20/16* (2006.01)
(Continued)

(52) U.S. Cl.
CPC .......... *B23K 20/16* (2013.01); *B23K 20/1205* (2013.01); *B23K 20/2275* (2013.01); *B23K 2103/20* (2018.08)

(58) Field of Classification Search
CPC ............... B23K 20/16; B23K 20/1205; B23K 20/2275; B23K 2103/20; B23K 20/12–1215; B29C 65/08
(Continued)

(56) References Cited

U.S. PATENT DOCUMENTS 3,134,278 A * 5/1964 Hollander .............. B23K 20/12
228/114.5
3,185,368 A * 5/1965 Holloway .............. B23K 20/12
228/2.3
(Continued)

FOREIGN PATENT DOCUMENTS

CN      101502911 A * 8/2009 ............. B23K 20/12
CN      105665915 A * 6/2016 ............. B23K 20/12
(Continued)

OTHER PUBLICATIONS

International Search Report dated Dec. 28, 2020, issued in counterpart International Application No. PCT/JP2020/040395. (2 pages).

*Primary Examiner* — Kiley S Stoner
(74) *Attorney, Agent, or Firm* — WHDA, LLP

(57) ABSTRACT

A dissimilar material solid phase bonding method is disclosed wherein one member and another member having different compositions are brought into contact with one another by way of an insert material to form an interface (1) to be bonded, at which the one member and the insert material are in contact with one another, and an interface (2) to be bonded, at which the other member and the insert material are in contact with one another; the temperature of the interface (1) to be bonded and the interface (2) to be bonded is raised by means of frictional heat and/or by
(Continued)

electrical heating; a bonding pressure (1) is applied substantially perpendicular to the interface (1) to be bonded; a bonding pressure (2) is applied substantially perpendicular to the interface (2) to be bonded; and the bonding pressure (1) and the bonding pressure (2) are set to different values.

4 Claims, 14 Drawing Sheets

(51) Int. Cl.
  *B23K 20/12* (2006.01)
  *B23K 20/227* (2006.01)
  *B23K 103/20* (2006.01)
(58) Field of Classification Search
  USPC .............. 228/115, 3.1, 112.1–114.5, 2.1–2.3, 228/233.1, 234.1, 235.1, 110.1, 1.1; 156/73.1, 73.5
  See application file for complete search history.

(56) References Cited

U.S. PATENT DOCUMENTS

| | | | | |
|---|---|---|---|---|
| 3,234,646 A * | 2/1966 | Hollander | ............. | B23K 20/12 228/113 |
| 3,235,157 A * | 2/1966 | Hollander | ............. | B23K 20/121 228/114.5 |
| 3,235,158 A * | 2/1966 | Hollander | ............. | B23K 20/12 228/114.5 |
| 3,235,162 A * | 2/1966 | Hollander | ............. | B23K 20/12 228/199 |
| 3,269,002 A * | 8/1966 | Hollander | ............. | B23K 20/12 228/113 |
| 3,269,003 A * | 8/1966 | Hollander | ............. | B23K 20/12 228/114.5 |
| 3,337,108 A * | 8/1967 | Taylor | ............. | B23K 20/121 228/2.3 |
| 3,484,926 A * | 12/1969 | Blum | ............. | B23K 20/12 228/178 |
| 3,504,425 A * | 4/1970 | Akhmedov | ............. | B23K 20/12 228/114.5 |
| 3,516,591 A * | 6/1970 | Gage | ............. | B23K 20/12 384/241 |
| 3,548,487 A * | 12/1970 | Stamm | ............. | B23K 20/121 228/114.5 |
| 3,570,740 A * | 3/1971 | Stamm | ............. | B23K 20/121 228/8 |
| 3,578,232 A * | 5/1971 | Loyd | ............. | F16C 19/54 82/147 |
| 3,635,388 A * | 1/1972 | Jenkinson | ............. | B23K 20/12 228/114.5 |
| 3,779,446 A * | 12/1973 | Lemelson | ............. | B29C 65/0681 72/317 |
| 4,552,609 A * | 11/1985 | Larsen | ............. | B29C 66/8322 228/2.3 |
| 4,657,626 A * | 4/1987 | Cearlock | ............. | B29C 66/8322 53/329.2 |
| 4,691,857 A * | 9/1987 | Friedman | ............. | B21D 26/027 228/265 |
| 7,353,978 B2 * | 4/2008 | Slattery | ............. | B23K 20/1205 228/2.1 |
| 8,998,067 B2 * | 4/2015 | Lehr | ............. | B23K 20/129 228/2.1 |
| 10,612,642 B2 * | 4/2020 | Yamawaki | ............. | B23K 20/1205 |
| 2002/0061417 A1 | 5/2002 | Shindo et al. | | |
| 2003/0031889 A1 | 2/2003 | Shindo et al. | | |
| 2014/0060956 A1 | 3/2014 | Takai | | |
| 2014/0191016 A1 * | 7/2014 | Lehr | ............. | B23K 20/1205 228/114.5 |
| 2016/0106970 A1 * | 4/2016 | Fangrow | ............. | A61M 39/02 156/60 |
| 2018/0290231 A1 * | 10/2018 | Büchler | ............. | B23K 20/00 |
| 2020/0139481 A1 * | 5/2020 | Haselhuhn | ............. | B23K 11/20 |
| 2022/0072648 A1 * | 3/2022 | Cloeter | ............. | B23K 11/20 |

FOREIGN PATENT DOCUMENTS

| | | | | |
|---|---|---|---|---|
| CN | 105665915 B | * | 1/2017 | ............. B23K 20/12 |
| CN | 106334871 A | * | 1/2017 | |
| CN | 106346128 A | * | 1/2017 | ......... B23K 20/1225 |
| CN | 107107229 A | * | 8/2017 | ............. B21D 22/02 |
| CN | 107107230 A | * | 8/2017 | ............. B23B 31/20 |
| CN | 107107254 A | * | 8/2017 | ............. B23K 20/12 |
| CN | 108608107 A | * | 10/2018 | ............. B23K 20/12 |
| DE | 4436857 A1 | * | 4/1996 | ......... B23K 20/1205 |
| DE | 102004012653 A1 | * | 10/2005 | ............. B23K 20/12 |
| EP | 0059544 A1 | * | 9/1982 | |
| EP | 0770447 A2 | * | 5/1997 | |
| EP | 3265266 B1 | * | 4/2020 | ............. B23K 20/121 |
| ES | 2627922 T3 | * | 8/2017 | ............. B23K 20/12 |
| GB | 1444467 A | * | 7/1976 | ............. B23K 20/12 |
| JP | 61-147980 A | | 7/1986 | |
| JP | 5-318144 A | | 12/1993 | |
| JP | 11-176268 A | | 7/1999 | |
| JP | 2004283916 A | * | 10/2004 | ............. B23K 20/12 |
| JP | 4090588 B2 | * | 5/2008 | ............. B23K 20/12 |
| JP | 2012-25179 A | | 2/2012 | |
| JP | 2014-46803 A | | 3/2014 | |
| JP | 2018-122344 A | | 8/2018 | |
| RU | 194005 U1 | * | 11/2019 | ............. B23K 20/12 |
| WO | WO-02078935 A1 | * | 10/2002 | ......... A61F 13/15739 |
| WO | WO-2005009663 A1 | * | 2/2005 | ............. B23K 20/10 |
| WO | 2017/022184 A1 | | 2/2017 | |

\* cited by examiner

DISSIMILAR MATERIAL SOLID PHASE BONDING METHOD, DISSIMILAR MATERIAL SOLID PHASE BONDED STRUCTURE, AND DISSIMILAR MATERIAL SOLID PHASE BONDING DEVICE

TECHNICAL FIELD

The present invention relates to a dissimilar material solid phase bonding method for solid phase bonding between metal materials, a dissimilar material solid phase bonding structure obtained by the dissimilar material solid phase bonding method, and a dissimilar material solid phase bonding device for using the dissimilar material solid phase bonding method.

BACKGROUND ART

With the increase in strength of metal materials such as steel and aluminum alloys, the decrease in strength at the bonded portion that determine the mechanical properties of the bonding structure has become a serious problem. On the other hand, in recent years, attention has been paid to a solid phase bonding method in which the maximum temperature reached during bonding does not reach the melting point of the material to be bonded and the decrease in strength at the bonded portion is smaller than that of conventional melt welding, and it is rapidly progressing to put into practical use.

In particular, as to "friction welding" in which a rotating columnar material to be bonded is pressed against a fixed material to be bonded and "linear friction welding" in which the material to be bonded is reciprocated in contact with the other material to be bonded, since it does not require a tool for press-fitting into the material to be bonded unlike friction stir welding, it can be easily applied to high melting point and high strength metals such as steel and titanium.

In addition, the present inventors have proposed a bonding method capable of accurately controlling the bonding temperature by the applied pressure at the time of bonding, and have succeeded in significantly lowering the bonding temperature. For example, Patent Document 1 (WO 2017/022184) discloses a friction welding method where surfaces to be bonded of two metal members to be bonded are made slide in contact with each other, wherein; at least one of the metal members to be bonded is a ferrous material, and a maximum temperature reached during bonding is equal to or less than the $A_3$ point or equal to or less than the $A_{cm}$ point of the ferrous material.

The conventional frictional bonding is a bonding method using frictional heat, but in the frictional bonding method described in Patent Document 1, by positively utilizing the processing heat generated by the plastic deformation of the metal materials to be bonded, a good bonding can be obtained even at a low bonding temperature.

Further, Patent Document 2 (Japanese Unexamined Patent Publication No. 2018-122344) discloses a linear friction welding method, comprising: a first step of forming the interface to be welded by bringing one member into contact with the other member, a second step of repeatedly sliding the one member and the other member on the same locus while applying a pressure substantially perpendicular to the interface to be welded, and discharging flash from the interface to be welded, a third step of forming a welding surface by stopping the sliding, wherein; setting the pressure to be greater than or equal to the yield stress and less than or equal to the tensile strength of the one member and/or the other member at the desired welding temperature.

In the linear friction welding method described in Patent Document 2, the relationship between the yield strength and the temperature is substantially constant depending on the material, and the temperature can be controlled extremely accurately by the applied pressure for discharging burrs from the interface to be bonded.

CITATION LIST

Patent Document

Patent Document 1: WO2017/022184
Patent Document 2: JP2018-122344A

SUMMARY OF THE INVENTION

Problem to be Solved by the Invention

However, an appropriate bonding method has not been established for dissimilar material bonding, which often forms fragile intermetallic compounds at the bonded interface in addition to different physical properties, and the merits of the sold phase bonding method that can control and lower the bonding temperature have not been fully enjoyed. Further, even when an intermetallic compound is not formed at the bonded interface, if the deformation behavior in the vicinity of the interface to be bonded is different during solid phase bonding, for example, when steel materials having different compositions are bonded, it is difficult to obtain a good joint by solid phase bonding.

In view of the above problems in the prior art, an object of the present invention is to provide a dissimilar material solid phase bonding capable of efficiently forming a strong bonded portion of metal materials having different compositions. Another object of the present invention is to provide a dissimilar material solid phase bonding structure having a dissimilar material solid phase bonded portion in which metal materials having different compositions are firmly bonded, and a dissimilar material solid phase bonding device to obtain the dissimilar material solid phase bonding structure.

MEANS TO SOLVE THE PROBLEMS

In order to achieve the above object, the present inventor has done intensive study as to deformation behavior of the interface to be bonded in the vicinity of the interface to be bonded during solid phase bonding of dissimilar materials, and have found that it is extremely important to provide an insert material on the interface to be bonded, to control the respective bonding temperature by setting the individual bonding pressure on the interface between the insert material and the one material to be bonded and on the interface between the insert material and the another material to be bonded, and to bond the dissimilar materials to be bonded having different compositions via the insert material, and have reached the present invention.

Namely, the present invention can provide a dissimilar material solid phase bonding method which is a solid phase bonding method for bonding one member and other member, characterized in that:

the one member and the other member have different compositions;

the one member and the other member are brought into contact with one another by way of an insert material to form an interface (1) to be bonded, at which the one member and the insert material are in contact with one another, and an interface (2) to be bonded, at which the other member and the insert material are in contact with one another;

the temperature of the interface (1) to be bonded and the interface (2) to be bonded is raised by means of frictional heat due to sliding between the one member and the other member, on the one hand, and the insert material, on the other hand, and/or by electrical heating;

a bonding pressure (1) is applied substantially perpendicular to the interface (1) to be bonded;

a bonding pressure (2) is applied substantially perpendicular to the interface (2) to be bonded; and the bonding pressure (1) and the bonding pressure (2) are set to different values.

In the dissimilar material solid phase bonding method of the present invention, the one member and the other member having different compositions are bonded, and, for example, it can be applied not only the case that the main elements are different such as a steel member and a titanium alloy member, but also the case of combination in which the main element is the same but the additive element is different such as a steel members having different compositions.

The dissimilar material solid phase bonding method of the present invention is a method of bonding members having different compositions via the insert material, and it is preferable that the insert material has "temperatures having substantially the same strength" as the one member and the other member. Although the strength of the metal material depends on the temperature, the insert material and the each member are deformed at the interface (1) to be bonded and at the interface (2) to be bonded by subjecting to solid phase bonding at a temperature at which the strength of the insert material and the one member and the strength of the insert material and the other member are substantially the same, to form new surfaces on the surfaces to be bonded of the insert material and each member, and a good bonding can be obtained by contacting the new surfaces with each other. Here, substantially the same strength does not mean that the strengths are completely the same, and it may be a strength range in which the formation of the new surfaces at the interface to be bonded proceeds to the same extent. Therefore, a difference of about several tens of MPa is allowed for "substantially the same strength".

In the dissimilar material solid phase bonding method of the present invention, it is necessary to accurately control the bonding temperature, and the object can be achieved by appropriately setting the bonding load applied substantially perpendicular to the interface to be bonded. For example, in the case of linear friction welding, the frictional heat increases when the applied pressure of the linear friction welding is increased, but since the softened material becomes burrs and is continuously discharged, the "bonding temperature" is determined by the pressure (force to discharge burrs) which is applied to the softened material. That is, when the applied pressure is set high, the material to be bonded with higher strength (state with high yield strength) can be discharged as burrs. Here, since the "state with higher yield strength" means the "state with lower temperature", the "bonding temperature" decreases as the applied pressure increases. Since the relationship between the yield strength and the temperature is substantially constant depending on the material, the bonding temperature can be controlled extremely accurately.

Even when the temperature of the interface (1) to be bonded and the interface (2) to be bonded is raised by energization heating, control of the bonding temperature by the bonding pressure can be similarly achieved, and since the softened material becomes burrs and is continuously discharged, the "bonding temperature" is determined by the pressure (force to discharge burrs) which is applied to the softened material. When energization heating is used, it does not necessarily have to be the same temperature because it is affected by the electric resistance of the metal.

Here, the method for raising the temperature in the vicinity of the interface to be bonded is not particularly limited as long as the effect of the present invention is not impaired, and various conventionally known temperature raising methods (bonding methods) can be used. For example, in addition to "friction welding" in which a rotating columnar material is pressed against a fixed material to be bonded, and "linear friction welding" in which the materials to be bonded are reciprocated in contact with each other, energization heating, high frequency heating, laser heating, flame heating and the like may be used. Further, the insert material may be moved (sliding) in a state where the one member and the other member are in contact with each other via the insert material, and the one member and the other member may be moved (sliding). Furthermore, when the one member and the other member are rotated by friction welding, the one member and the other member may be rotated in opposite directions.

Further, in the dissimilar material solid phase bonding method of the present invention, it is preferable that there is a temperature (1) at which the insert material and the one member have substantially the same strength, there is a temperature (2) at which the insert material and the other member have substantially the same strength, and the temperature (1) and the temperature (2) have different values. When the composition of the one member and the other member are different, since the temperature at which the strengths of the insert material and each member are substantially the same is different, the bonding pressure (1) and the bonding pressure (2) are set to different values. Here, it is preferable that the bonding temperature is the temperature (1) and/or the temperature (2), but the values do not necessarily have to be the same, and even when a new surface of the insert material and the material to be bonded is formed at the interface to be bonded, the bonding can be achieved. Further, it is also preferable to pay attention to the influence of the sizes of the material to be bonded and the insert material on the bonding temperature.

The greatest feature of the dissimilar material solid phase bonding method of the present invention is to apply the bonding pressures (bonding pressure (1) and bonding pressure (2)) to the interface (1) to be bonded where the one member and the insert material are in contact with each other, and the interface (2) to be bonded where the other member and the insert material are in contact with each other substantially perpendicular thereto, respectively, and the bonding pressure (1) and the bonding pressure (2) are set to different values. By setting the bonding pressure (1) and the bonding pressure (2) to different pressures, it is possible to realize a bonding temperature suitable for bonding the new surfaces at each interface to be bonded.

Further, in the dissimilar material solid phase bonding method of the present invention, it is preferable that the bonding pressure (1) is set to a value equal to or higher than the yield stress and equal to or lower than the tensile strength of the insert material and the one member at the temperature (1), and the bonding pressure (2) is set to a value equal to or higher than the yield strength and equal to or lower than the tensile strength of the insert material and the one member at the temperature (2). When the pressure at the time of solid phase bonding is set to be equal to or higher than the yield stress of the material to be bonded, the discharge of burrs from the interface to be bonded is started, and when the pressure is increased up to the tensile strength, the discharge of burrs is accelerated. Similar to the yield stress, since the tensile strength at a specific temperature is substantially constant depending on the material to be bonded, the bonding temperature corresponding to the set pressure can be realized.

Further, in the solid phase bonding of dissimilar materials of the present invention, though the bonding temperature is basically determined by the combination of the one member, the other member and the insert material, when using an iron-based metal as the material to be bonded, it is preferable to set the bonding temperature to an $A_1$ point or less of the iron-based metal used as the material to be bonded. In the iron-based metals, there is a case that brittle martensite is formed by phase transformation to make bonding difficult and to make the bonded portion brittle. On the other hand, when the bonding temperature is set to the $A_1$ point or less, since any phase transformation does not occur, the formation of brittle martensite can be completely suppressed. When using a titanium alloy as the material to be bonded, the bonding temperature is preferably set to be equal to or lower than the ß transus temperature of the titanium alloy. By setting the bonding temperature to be equal to or lower than the ß transus temperature of the titanium alloy, the structure of the bonded portion can be made into fine equiaxial grains, and a bonded portion having both high strength and toughness can be formed. Further, when using a nickel-based superalloy as the material to be bonded, it is possible to suppress decrease in the strength of the joint.

Further, in the solid phase bonding of dissimilar materials of the present invention, the bonding temperature may be adjusted by subjecting the one member and/or the other member to external cooling and/or external heating. By subjecting to the external cooling and/or external heating, it is possible to control the deformation of the one member or the other member in the vicinity of the interface to be bonded, and/or to discharge the burrs.

Further, in the dissimilar material solid phase bonding method of the present invention, it is preferable that the one member is an aluminum alloy member and the other member is an iron-based metal member, a copper-based metal member, or a titanium-based member. At the bonded interface between the aluminum alloy and these metal members, a fragile intermetallic compound layer is likely to be formed, and it is extremely difficult to obtain a joint having high mechanical properties. Further, when there is a difference in strength between the materials to be bonded, the material to be bonded with weak strength is unilaterally deformed, and it is difficult to form a new surface of the material to be bonded with high strength. On the other hand, in the dissimilar material solid phase bonding method of the present invention, since the aluminum alloy and the insert material, and the iron-based metal (copper-based metal, titanium-based metal) and the insert material can be bonded in the solid phase by being in contact with each new surface, not only the bonding between the new surfaces is achieved, but also a good joint in which the formation of intermetallic compounds is suppressed can be obtained. In the present invention, the iron-based metal means a metal mainly composed of iron in the composition, and includes, for example, various steels, cast iron, and the like. Further, in the present invention, the copper-based metal means a metal mainly composed of copper in the composition, and the titanium-based metal means a metal mainly composed of titanium in the composition.

Further, the present invention can also provide a dissimilar material solid phase bonded structure characterized in that:
one member and the other member have a solid-phase bonded portion integrated via an insert material;
at least one of the one member and the other member has a composition different from that of the insert material;
at the bonded interface (1) where the one member and the insert material are in contact with each other, the one member and the insert material are both deformed, and
at the bonded interface (2) where the other member and the insert material are in contact with each other, the other member and the insert material are both deformed.

In the dissimilar material solid phase bonded structure of the present invention, at the bonded interface (1) where the one member and the insert material are in contact with each other, both the one member and the insert material are deformed, and at the bonded interface (2) where the other member and the insert material are in contact with each other, both the other member and the insert material are deformed. This means that at the bonded interface (1) and the bonded interface (2), the new surface of the insert material yielded by the deformation and the new surface of each member are in contact with each other to form a good bonded interface. Here, the "deformation" includes the formation of burrs, plastic deformation, and the like, but the "deformation" in the present invention means the one accompanied by the formation of a new surface at the interface to be bonded.

The degree of deformation of the one member, the other member, and the insert material is not particularly limited as long as the bonding by the contact between the new surfaces is achieved, but it is preferable that the bonding by the contact between the new surfaces is achieved over the entire area of the surface to be bonded. In order to achieve the bonding by the contact between the new surfaces over the entire area of the surface to be bonded, it is preferable that the area of the surface to be bonded after deformation should be twice or more the original area, including the part discharged as burrs.

Further, in the dissimilar material solid phase bonded structure of the present invention, it is preferable that the one member is an aluminum alloy member and the other member is an iron-based metal member, a copper-based metal member, or a titanium-based member. At the bonded interface between the aluminum alloy and these metal members, a fragile intermetallic compound layer is likely to be formed, and it is extremely difficult to obtain a joint having high mechanical properties. On the other hand, in the dissimilar material solid phase bonding method of the present invention, since the aluminum alloy and the insert material, and each metal and the insert material can be bonded in the solid phase by being in contact with each new surface, not only the bonding between the new surfaces is achieved, but also a good joint in which the formation of intermetallic compounds is suppressed can be obtained.

Further, in the dissimilar material solid phase bonded structure of the present invention, it is preferable that the thickness of the intermetallic compound layer at the bonded interface (1) and the bonded interface (2) is less than 1 μm. It is known that when a thick intermetallic compound layer is formed at the bonded interface, the mechanical properties of the joint such as tensile strength and toughness are significantly reduced, but in the dissimilar material solid phase bonded structure of the present invention, since the thickness of the intermetallic compound layer is less than 1 µm at both the bonded interface (1) and the bonded interface (2), high mechanical properties can be ensured.

Here, the thickness of the intermetallic compound layer at the bonded interface (1) and the bonded interface (2) is preferably less than 500 nm over the entire solid phase bonded interface, and more preferably less than 300 nm, most preferably less than 100 nm. As a result of the formation of a thin intermetallic compound layer over the entire solid phase bonded interface, the solid phase bonded interface has high strength, and the bonded portion can exhibit excellent mechanical properties (strength, toughness, etc.).

Further, in the dissimilar material bonding structure of the present invention, it is preferable that the solid phase bonded interface contains recrystallized grains. Since the structure in the vicinity of the bonded interface becomes fine equi-axial recrystallized grains, it is possible to make the bonded portion having excellent mechanical properties such as strength, toughness, and reliability.

The dissimilar material bonding structure of the present invention can be suitably obtained by the dissimilar material solid phase bonding method of the present invention.

Further, the present invention can also provide a dissimilar material solid phase bonding device which is a solid phase bonding device for bonding one member and the other member, characterized by comprising:

a gripping mechanism where the one member and the other member are brought into contact with each other via an insert material, the one member and the insert material are in contact with each other to form an interface (1) to be bonded, and the other member and the insert material are in contact with each other to form an interface (2) to be bonded;

a sliding mechanism where the insert material is moved linearly or rotatably between the one member and the other member, and/or a sliding mechanism where the one member and the other member are moved linearly or rotatably while being in contact with the insert material, and/or an energization heating mechanism where the interface (1) to be bonded and the interface (2) to be bonded are energized and heated, and a pressing mechanism where a bonding pressure (1) is applied substantially perpendicular to the interface (1) to be bonded, a bonding pressure (2) is applied substantially perpendicular to the interface (2) to be bonded, and the bonding pressure (1) and the bonding pressure (2) are capable of setting to different values.

The dissimilar material solid phase bonding device of the present invention is a device that can be suitably used for obtaining the dissimilar material solid phase bonded structure of the present invention by the dissimilar material solid phase bonding method of the present invention. In the dissimilar material solid phase bonding device of the present invention, the "grasping mechanism", the "sliding mechanism and/or energization heating mechanism" and the "pressing mechanism" are essential, and the greatest feature is that the bonding pressure (1) and the bonding pressure (2) in the pressure mechanism can be set to different values.

The specific method for setting the bonding pressure (1) and the bonding pressure (2) to different values is not particularly limited as long as the effect of the present invention is not impaired, and, for example, it may be fixed to a reference site different from the member to be bonded (the one member and the other member), and different bonding pressures may be applied from both sides of the independently fixed insert material. Further, the pressing mechanism may be separately provided at the site where the insert material is fixed.

More specifically, for example, in a conventional general linear friction bonding device, there is employed a simple structure where the one member is fixed, the other member is brought into contact with the one member to apply a bonding pressure, and at the same time to vibrate the other member. On the other hand, in the dissimilar material solid phase bonding device of the present invention, for example, the insert material may be connected to the vibrating part and different bonding pressures may be applied from the left and right sides of the insert material.

Further, in the dissimilar material solid phase bonding device of the present invention, it is preferable that when there is a temperature (1) at which the insert material and the one member have substantially the same strength, and there is a temperature (2) at which the insert material and the other member have substantially the same strength, a value that is equal to or higher than the yield stress and equal to or lower than the tensile strength of the insert material and the one member at the temperature (1) can be applied to the interface (1) to be bonded as the bonding pressure (1), and a value that is equal to or higher than the yield strength and equal to or lower than the tensile strength of the insert material and the one member at the temperature (2) can be applied to the interface (2) to be bonded as the bonding pressure (2).

When the pressure at the time of solid phase bonding is set to be equal to or higher than the yield stress of the material to be bonded, the discharge of burrs from the interface to be bonded is started, and when the pressure is increased up to the tensile strength, the discharge of burrs is accelerated. Similar to the yield stress, since the tensile strength at a specific temperature is substantially constant depending on the material to be bonded, the bonding temperature corresponding to the set pressure can be realized. As long as the effect of the present invention is not impaired, the method of applying the bonding pressure is not particularly limited, and various conventionally known methods can be used.

Further, in the dissimilar material solid phase bonding device of the present invention, it is preferable that the temperature in the vicinity of the interface (1) to be bonded and the vicinity of the interface (2) to be bonded and the bonding load are measured during bonding, and the measured temperature is compared with the bonding temperature predicted from the bonding conditions, and if the measured temperature is higher than the predicted bonding temperature, the bonding load is increased, and if the measured temperature is lower than the bonding temperature, the bonding load is deceased. By having the feedback mechanism, the bonding temperature can be controlled more accurately.

Effect of the Invention

According to the present invention, it is possible to provide a dissimilar material solid phase bonding capable of efficiently forming a strong bonded portion of metal materials having different compositions. In addition, according to the present invention, it is possible to provide a dissimilar material solid phase bonding structure having a dissimilar material solid phase bonded portion in which metal materials having different compositions are firmly bonded, and a dissimilar material solid phase bonding device to obtain the dissimilar material solid phase bonding structure.

EMBODIMENTS FOR ACHIEVING THE INVENTION

In the following, by referring the drawings, as the typical embodiments of the dissimilar material solid phase bonding method, the dissimilar material bonding structure and the dissimilar material solid phase bonding device of the present invention, the linear friction welding is mainly explained as a typical case, but the present invention is not limited thereto. In the following explanation, the same symbol is given to the same or corresponding parts, and there is a case where overlapping explanation is omitted. In addition, since these drawings are presented to explain the concept of the present invention, there are cases where size and ratio of the structural elements are different from the real case.

(1) Dissimilar Material Solid Phase Bonding Method

Figure 1:
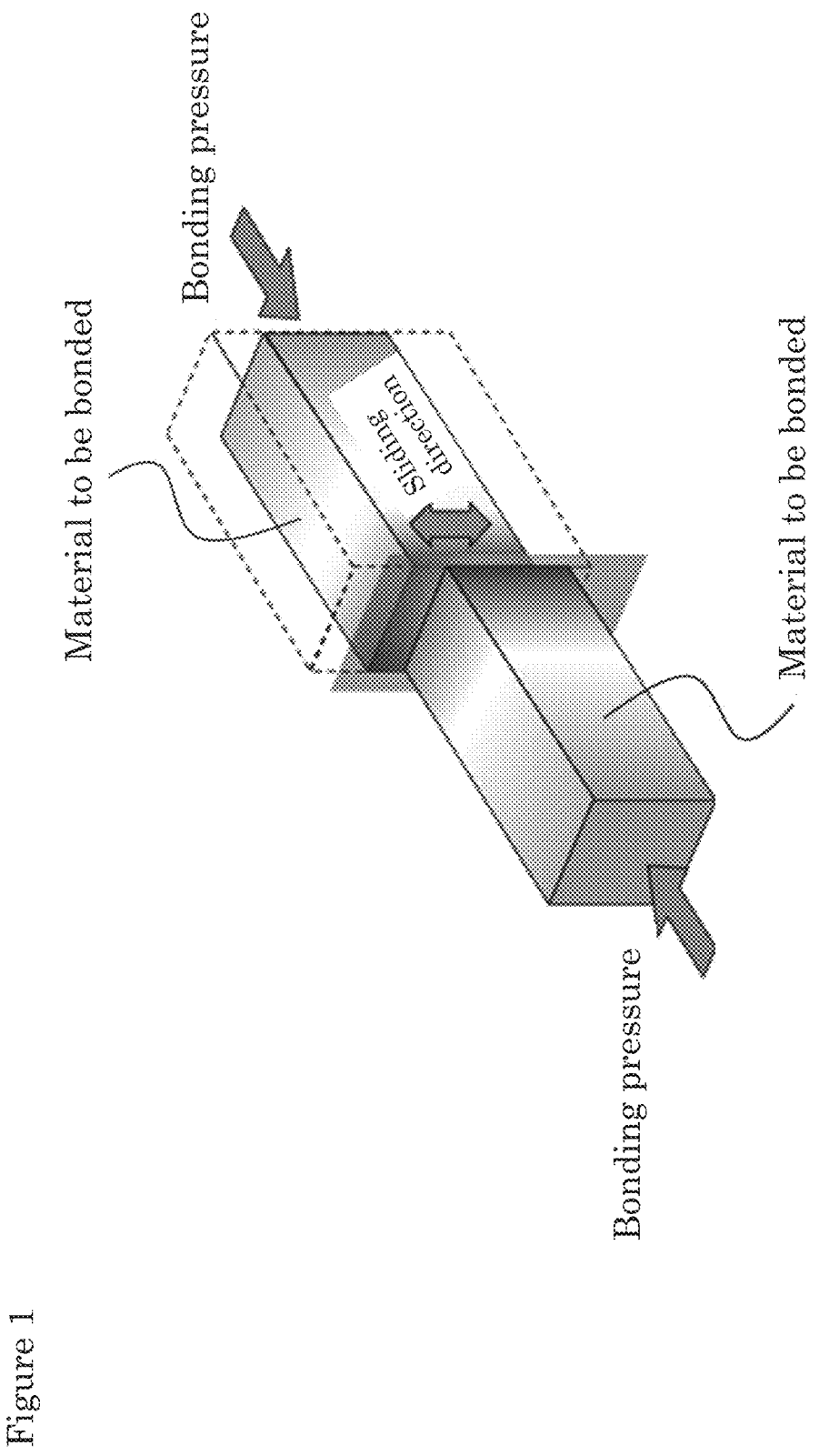
FIG. 1 is a schematic diagram which shows the situation during the general linear friction welding.

FIG. 1 is a schematic diagram which shows the general situation during the linear friction welding. The linear friction welding is a solid phase bonding in which the frictional heat generated when the materials to be bonded are rubbed against each other by linear motion is the main heat source. In the conventional linear friction welding, the material softened by the temperature rise is discharged as burrs from the interface to be bonded to remove the oxide film formed on the interface to be bonded, and the new surfaces are brought into contact with each other to obtain the bonded portion.

Figure 2:
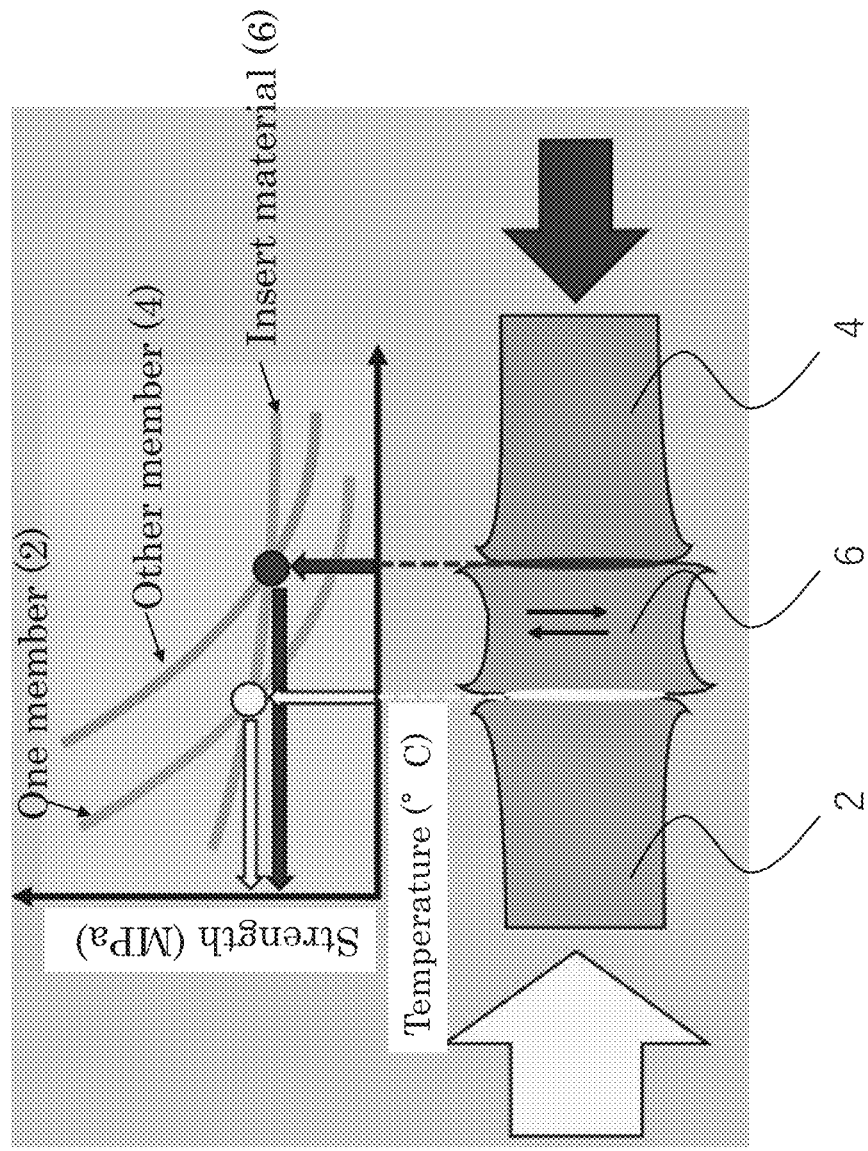
FIG. 2 is a schematic diagram which shows the relationship between the state during bonding and the bonding temperature of the dissimilar material solid phase bonding method of the present invention.

FIG. 2 schematically shows the relationship between the state during bonding and the bonding temperature of the dissimilar material solid phase bonding method of the present invention. In the dissimilar material solid phase bonding method of the present invention, the one member 2 and the other member 4 having different compositions are brought into contact with one another via the insert material 6 to form the interface (1) to be bonded, at which the one member 2 and the insert material 6 are in contact with one another, and the interface (2) to be bonded, at which the other member 4 and the insert material 6 are in contact with one another.

In this state, when the principle of linear frictional welding is used, frictional heat is generated at the interface (1) to be bonded and the interface (2) to be bonded by repeatedly sliding the insert material 6 up and down. When the principle of friction welding is used, the insert material 6 is rotated to generate frictional heat, and when the principle of energization heating is used, the interface (1) to be bonded and the interface (2) to be bonded are energized in the substantially vertical direction to generate Joule heat.

Here, a bonding pressure (1) is applied substantially perpendicular to the interface (1) to be bonded, a bonding pressure (2) is applied substantially perpendicular to the interface (2) to be bonded and the bonding pressure (1) and the bonding pressure (2) are set to different values. The graph shown on the upper side of FIG. 2 schematically shows the temperature dependence of the strengths of the one member 2, the other member 4, and the insert material 6. When the one member 2 and the other member 4 have the temperature dependence of the strength as shown in FIG. 2, since there is no temperature at which the strengths of the one member 2 and the other member 4 are the same, in the interface to be bonded, the one member 2 and the other member 4 cannot be deformed to the same extent. On the other hand, by using the insert material 6 having the temperature dependence of the strength as shown in FIG. 2, a good joint can be obtained by being contact with the new surfaces at the interface (1) to be bonded and the interface (2) to be bonded.

More specifically, the line showing the temperature dependence of the strength of the insert material 6 have intersections with both the line showing the temperature dependence of the strength of the one member 2 and the line showing the temperature dependence of the strength of the other member 4. Here, it may be set so that at the interface (1) to be bonded, the bonding pressure (1) corresponding to the intersection of the one member 2 and the insert material 6 is applied, and at the interface (2) to be bonded, the bonding pressure (2) corresponding to the intersection of the other member 4 and the insert material 6 is applied.

Figure 3:
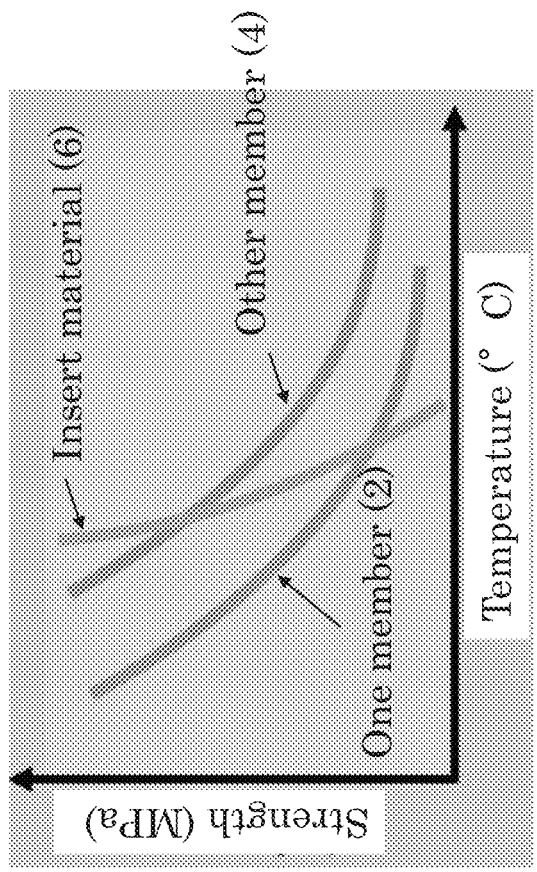
FIG. 3 is an example of the temperature dependence of the strengths of the material to be bonded and the insert material.

The relationship of the temperature-dependent of the strength shown in FIG. 2 is an example, and, there may be used, for example, a combination of the material to be bonded and the insert material 6 having the temperature dependence of the strength as shown in FIG. 3. The insert material 6 may have an "intersection" with the one member 2 and the other member 4, and can be selected from various conventionally known metal materials. Although not limited to this, in general, many metals having a bcc crystal structure have a small temperature dependence of the strength, and are candidates for the insert material when bonding metals having an fcc crystal structure to each other. On the other hand, when bonding metals having a bcc crystal structure to each other, the metal having an fcc crystal structure is a candidate for the insert material.

Further, the shape and size of the insert material 6 are not particularly limited as long as the effect of the present invention is not impaired, and it may be determined as appropriate in consideration of the ease of fixing to the bonding device, the ease of sliding (when utilizing frictional heat generation), and the characteristics of the joint, the cost of the material, and the like. Here, when the insert material 6 is thin, the influence of the insert material 6 on the joint characteristics can be reduced, but when it is too thin, since it may be deformed in the bonding process, it is preferable to consider the balance between them. Further, even when the strength of the insert material 6 is lower than that of the one member 2 and/or the other member 4, by adjusting the thickness of the insert material 6, it is possible to suppress a decrease in strength of the bonded portion by utilizing the plastic restraint phenomenon.

Figure 4:
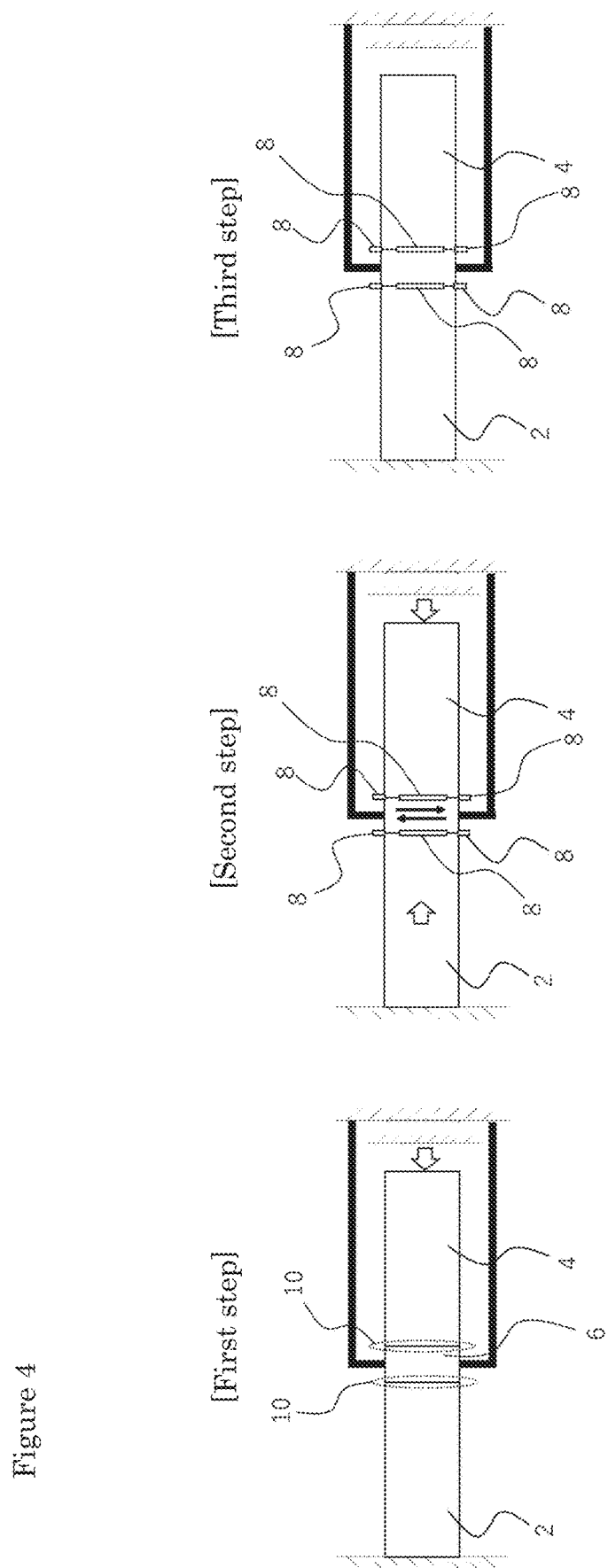
FIG. 4 is a schematic diagram which shows the bonding step of the dissimilar material solid phase bonding method (when linear friction welding is used).

FIG. 4 is a schematic diagram showing the bonding process of the dissimilar material solid phase bonding method (when linear friction bonding is used). When the linear friction welding is used, there are the first step where the one member 2 and the other member 4 are brought into contact with one another via the insert material 6 to form the interface (1) to be bonded, at which the one member 2 and the insert material 6 are in contact with one another, and the interface (2) to be bonded, at which the other member 4 and the insert material 6 are in contact with one another; the second step where a bonding pressure (1) is applied substantially perpendicular to the interface (1) to be bonded, a bonding pressure (2) is applied substantially perpendicular to the interface (2) to be bonded, the bonding pressure (1) and the bonding pressure (2) set to different values, the friction heat is generated by sliding the one member 2 and the other member 4 with the material 6, the temperature of the interface to be bonded (1) and the interface to be bonded (2) is raised, and the burr 8 is discharged from the interface to be bonded substantially parallel to and substantially perpendicular to the sliding direction; and the third step where the sliding is stopped to form the bonded surface. The bonding temperature can be accurately controlled by the bonding load applied substantially perpendicular to the interface to be bonded. Hereinafter, each step will be described in detail.

(1-1) First Step

The first step is a step where the one member 2 and the other member 4 are brought into contact with one another via the insert material 6 to form the interface (1) to be bonded, at which the one member 2 and the insert material 6 are in contact with one another, and the interface (2) to be bonded, at which the other member 4 and the insert material 6 are in contact with one another. The one member 2 and/or the other member 4 is moved to a position where the formation of the bonded portion is desired, and the surface to be bonded is brought into contact with each other via the insert material 6 to form the interface 10 to be bonded.

The shape and size of the one member 2 and the other member 4 are not particularly limited as long as the effects of the present invention are not impaired, and may be anyone that the temperature in the vicinity of the interface 10 to be bonded can be raised by sliding the insert material 6, energization heating, or the like. Here, when the linear friction welding is used, it is preferable that the interface 10 to be bonded is square or rectangular. By making the interface 10 to be bonded square or rectangular, it is possible to determine the timing at which the bonding (sliding) is stopped by using the discharge status of the burr 8 as an index.

(1-2) Second Step

The second step is a step where a bonding pressure (1) is applied substantially perpendicular to the interface (1) to be bonded, a bonding pressure (2) is applied substantially perpendicular to the interface (2) to be bonded, the bonding pressure (1) and the bonding pressure (2) set to different values, the friction heat is generated by sliding the one member 2 and the other member 4 with the material 6, the temperature of the interface to be bonded (1) and the interface to be bonded (2) is raised, and the burr 8 is discharged from the interface to be bonded substantially parallel to and substantially perpendicular to the sliding direction.

The method of repeatedly sliding the insert material 6 between the one member 2 and the other member 4 on the same locus is not particularly limited as long as the effect of the present invention is not impaired, and various conventionally known methods can be used. Here, when the insert material 6 is slid linearly, various conventionally known linear friction welding methods may be used, and when the insert material 6 is rotated and slid, various conventionally known friction welding methods may be used.

Here, in the dissimilar material solid phase bonding method of the present invention, it is preferable that there is a temperature (1) at which the insert material 6 and the one member 2 have substantially the same strength, there is a temperature (2) at which the insert material 6 and the other member 4 have substantially the same strength, and the temperature (1) and the temperature (2) have different values. When the compositions of the one member 2 and the other member 4 are different, since the temperature at which the strengths of the insert material 6 and each member are substantially the same is different, the bonding pressure (1) and the bonding pressure (2) will be set to different values.

Further, it is preferable that the bonding pressure (1) is set to a value equal to or higher than the yield stress and equal to or lower than the tensile strength of the insert material 6 and the one member 2 at the temperature (1), and the bonding pressure (2) is set to a value equal to or higher than the yield strength and equal to or lower than the tensile strength of the insert material 6 and the other member 4 at the temperature (2). When the pressure at the solid bonding is set to be equal to or higher than the yield stress of the material to be bonded, the discharge of burrs 8 from the interface 10 to be bonded is started, and when the pressure is increased up to the tensile strength, the discharge of burrs 8 is accelerated. Similar to the yield stress, since the tensile strength at a specific temperature is substantially constant depending on the material to be bonded, the bonding temperature corresponding to the set pressure can be realized.

When both members are deformed at the interface 6 to be bonded, the new surfaces are formed on the surfaces to be bonded of both members, so that the new surfaces come into contact with each other to obtain a good bonded portion. Here, since the temperature dependence of the strength is different between the one member 2 and the other member 4, though the deformation behavior and the burr discharge status in the vicinity of the interface 10 to be bonded are also different, it may be allowable if a new surface is formed at the interface 10 to be bonded due to the deformation and the discharge of the burr 8.

In the dissimilar material solid phase bonding method of the present invention, it is necessary to set bonding parameters other than the pressure, but these values are not limited as long as the effect of the present invention is not impaired, and may be appropriately set depending on the property, shape, size and the like of the material to be bonded. Typical bonding parameters other than the pressure include, in the case of the linear friction welding, the frequency and amplitude for vibrating the insert material 6, bonding time, burn-off length, and the like, and in the case of the friction welding, the rotation speed of the insert material 6, bonding time, burn-off length, and the like, and in the case of the energization heating, the current value, bonding time, burn-off length, and the like.

(1-3) Third Step

The third step is a step of stopping sliding in the second step to form a bonding surface. A good bonded body can be obtained by stopping the sliding after the burrs 8 are discharged from the entire surface of the interface 10 to be bonded. The bonding pressure (1) and the bonding pressure (2) applied to each material to be bonded in the second step may be maintained as it is, or may be set to a higher value for the purpose of discharging the burr 8 and making the new surface being brought into contact more strongly.

Here, though the timing at which the sliding is stopped is not limited as long as the burr 8 is discharged from the entire surface of the interface 10 to be bonded, in the interface (1) to be bonded and the interface (2) to be bonded, it is preferable to set the burn-off length so that the new surface is formed in the entire area of these interfaces to be bonded in the one member 2 and the other member 4, and is more preferable to form the new surfaces in the entire area of the interface 10 to be bonded in both the one member 2 and the other member 4. When the new surfaces of the one member 2 and the other member 4 come into contact with the new surface of the insert 6, a strong bonding can be obtained. Here, it is more preferable to stop the increase in the burn-off length at the timing when the new surface is formed over the entire interface 10 to be bonded in both members. By terminating the bonding process at this timing, it is possible to obtain a good bonding in which the entire area of the interface 10 to be bonded is bonded by the contact between the new surfaces most efficiently. By making the total of the surface area of the discharged burrs 8 and the increase area in the interface 10 to be bonded increased due to the deformation of the material to be bonded approximately twice the area of the interface 10 to be bonded before bonding, it is possible to form the new surface over the entire interface 10 to be bonded.

(2) Dissimilar Material Bonding Structure

Figure 5:
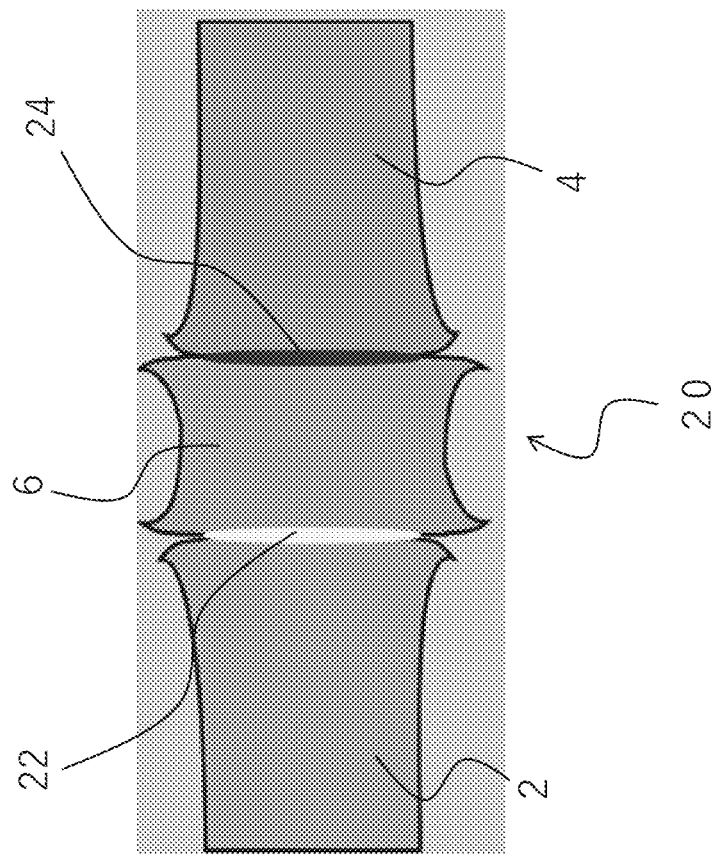
FIG. 5 is a schematic cross-sectional view which shows an example of the dissimilar material bonded structure of the present invention.

FIG. 5 is a schematic sectional view which shows one example of the dissimilar material bonding structure of the present invention. The dissimilar material bonding structure 20 is one in which the one member 2 and the other member 4 having different compositions are solid-phase bonded integrally via the insert material 6. It is characterized in that at the bonded interface (1) the one member 2 and the insert material 6 are both deformed, and at the bonded interface (2) the other member 4 and the insert material 6 are both deformed. This means that at the bonded interface (1) and the bonded interface (2), the new surfaces of the insert material 6 generated by deformation and the new surface of each member are in contact with each other to form a good bonded interface.

The degree of deformation of the one member 2, the other member 4, and the insert material 6 is not particularly limited as long as the bonding by the contact between the new surfaces is achieved, but it is preferable that the bonding by the contact between the new surfaces is achieved over the entire area of the surface to be bonded. In order to achieve the bonding by the contact between the new surfaces over the entire area of the surface to be bonded, it is preferable that the area of the surface to be bonded after deformation should be twice or more the original area, including the part discharged as burrs 8.

The one member 2 and the insert material 6 are metal-bonded via the solid phase bonded interface 22, and the other member 4 and the insert material 6 are metal-bonded via the solid phase bonded interface 24. Further, it is preferable that the thickness of the intermetallic compound layer at the bonded interface (1) and the bonded interface (2) is less than 1 μm. It is known that when a thick intermetallic compound layer is formed at the bonded interface, the mechanical properties of the joint such as tensile strength and toughness are significantly reduced, but in the dissimilar material solid phase bonded structure 20, since the thickness of the intermetallic compound layer is less than 1 μm at both the bonded interface (1) and the bonded interface (2), high mechanical properties can be ensured.

Here, the thickness of the intermetallic compound layer at the bonded interface (1) and the bonded interface (2) is preferably less than 500 nm over the entire solid phase bonded interface, and more preferably less than 300 nm, most preferably less than 100 nm. As a result of the formation of the thin intermetallic compound layer over the entire solid phase bonded interface (22, 24), the solid phase bonded interface (22, 24) has high strength, and the bonded portion can exhibit excellent mechanical properties (strength, toughness, etc.). Here, the intermetallic compound layer does not necessarily have to be observed, and when it is not clearly observed, it indicates that the thickness is less than 500 nm.

Further, in the dissimilar material bonded structure 20, it is preferable that the solid phase bonded interfaces (22, 24) contain recrystallized grains. Since the structure in the vicinity of the bonded interface becomes fine equiaxial recrystallized grains, it is possible to make the bonded portion having excellent mechanical properties such as strength, toughness, and reliability.

Further, it is preferable that the one member 2 is an aluminum alloy member and the other member 4 is an iron-based metal member, a copper-based metal member, or a titanium-based member. At the bonded interface between the aluminum alloy and these metal members, a fragile intermetallic compound layer is likely to be formed, and it is extremely difficult to obtain a joint having high mechanical properties. Further, when there is a difference in strength between the materials to be bonded, the material to be bonded with weak strength is unilaterally deformed, and it is difficult to form a new surface of the material to be bonded with high strength. On the other hand, in the dissimilar material solid phase bonding method of the present invention, since the aluminum alloy and the insert material 6, and each metal and the insert material 6 can be bonded in the solid phase by being in contact with each new surface, not only the bonding between the new surfaces is achieved, but also a good joint in which the formation of intermetallic compounds is suppressed can be obtained.

Further, in the dissimilar material bonding structure 20, it is preferable that the width (diameter in the case of a cylinder) of the one member 2 and/or the other member 4 is 10 mm or more. When the width of the material to be bonded becomes large, since it becomes difficult to control the bonding temperature at the interface to be bonded, it is not possible to form a homogeneous bonded interface by the conventional bonding method. On the other hand, in the dissimilar material bonding structure 20, the thickness of the intermetallic compound layer is less than 1 μm in the entire solid phase bonded interfaces (22, 24) even when the width (in the case of a cylinder, the diameter is 10 mm or more) is 10 mm or more. Here, the width (diameter in the case of a cylinder) of the one member 2 and/or the other member 4 is preferably 15 mm or more, and more preferably 20 mm or more.

(3) Dissimilar Material Solid Phase Bonding Device

Figure 6:
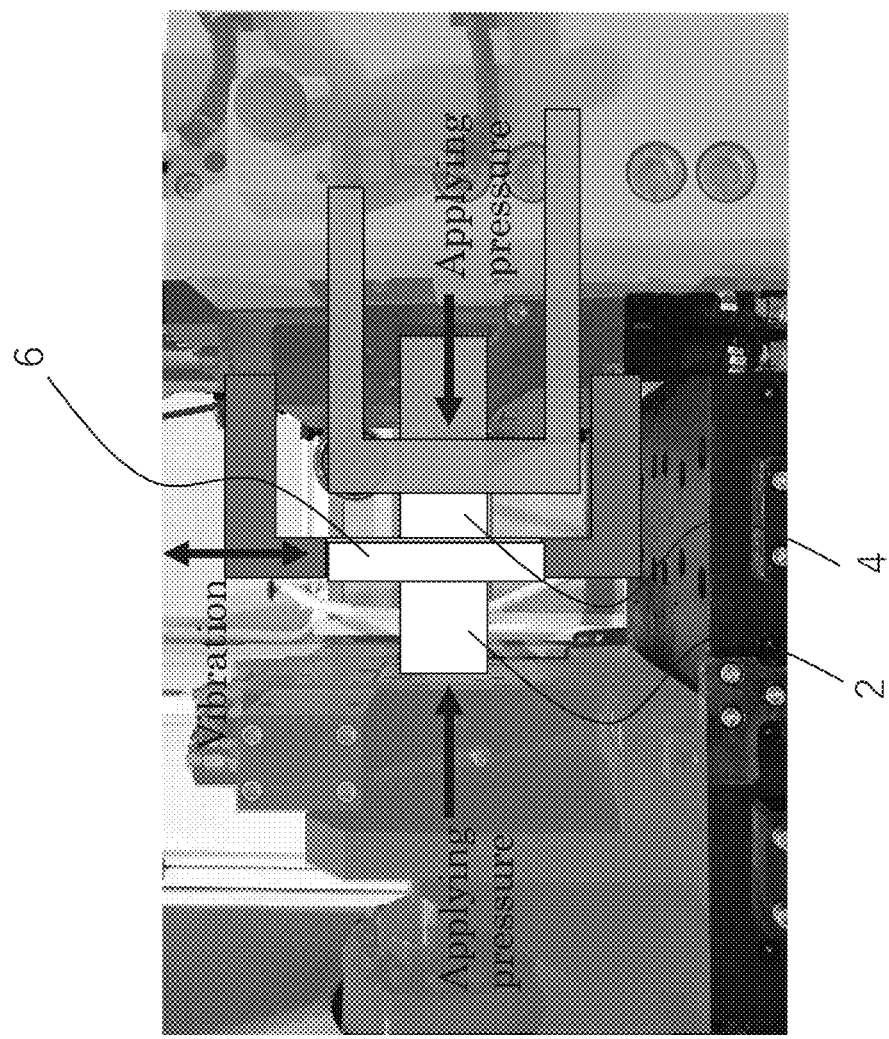
FIG. 6 is a schematic diagram of the dissimilar material solid phase bonding device using the principle of the linear friction welding.
Figure 7:
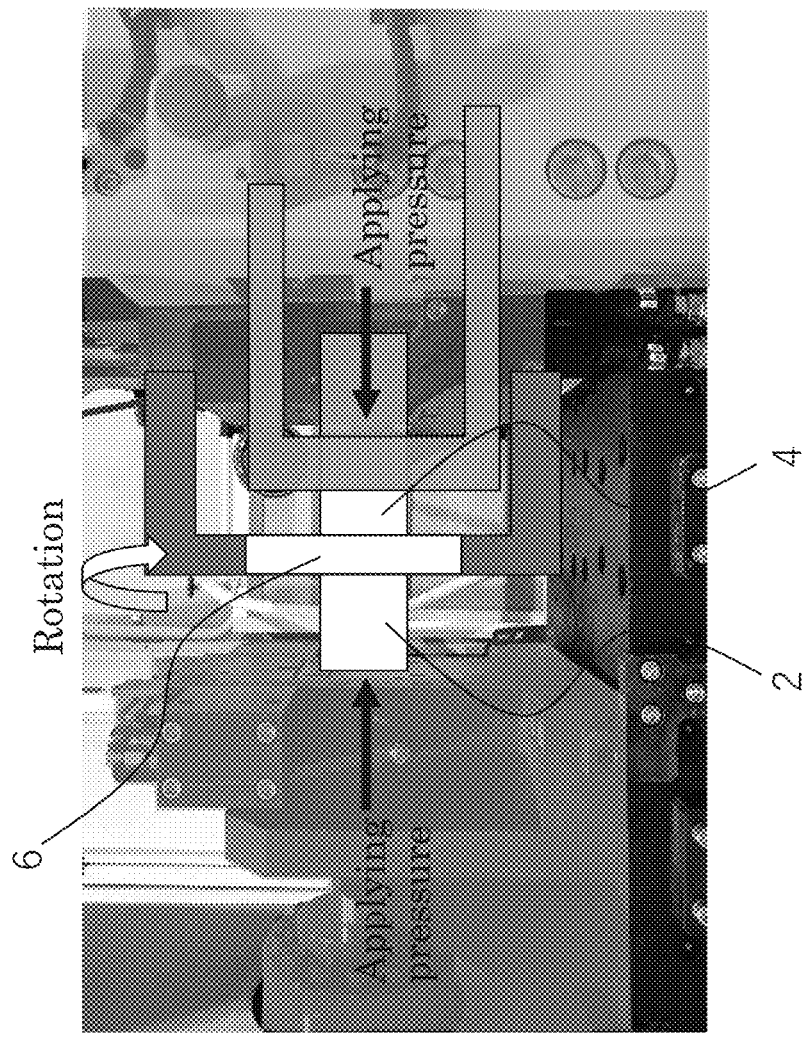
FIG. 7 is a schematic diagram of the dissimilar material solid phase bonding device using the principle of the friction welding.

A schematic diagram of the dissimilar material solid phase bonding device using the principle of the linear friction welding is shown in FIG. 6, and a schematic diagram of the dissimilar material solid phase bonding device using the principle of the friction welding is shown in FIG. 7, respectively.

The conventional linear friction bonding device has a simple structure in which a vibrating material to be bonded is brought into contact with a fixed material to be bonded and a bonding pressure is applied. On the other hand, in the dissimilar material solid phase bonding device shown in FIG. 6, there is employed the mechanism where the insert material 6 is gripped (fixed) to the vibrating portion, and the one member 2 and the other member 4 are brought into contact with each other from the left and right sides of the insert material 6, and the insert material 6 can be slid while applying different bonding pressures. The insert material 6 is independently fixed to the reference portion different from the one member 2 and the other member 4, and the bonding pressure from the left and right can be easily controlled as long as the insert material 6 is not deformed or the like.

In the dissimilar material solid phase bonding device shown in FIG. 7, there is employed the mechanism where the insert material 6 is gripped (fixed) to the rotating axis, and the one member 2 and the other member 4 are brought into contact with each other from the left and right sides of the insert material 6, and the insert material 6 can be rotated while applying different bonding pressures.

Even in the dissimilar material solid phase bonding device using the energization heat generation, the insert material 6 is independently fixed to the reference portion different from the one member 2 and the other member 4, but it is not necessary to slide or rotate the insert material 6. On the other hand, it is necessary to provide the mechanism for energizing the interface to be bonded in a substantially vertical direction and raising the temperature of the interface to be bonded by Joule heat generation.

Although the typical embodiments of the present invention have been described above, the present invention is not limited to these, and various design changes are possible, and all of these design changes are included in the technical scope of the present invention.

EXAMPLE

Example 1

An aluminum alloy (A7075-T6) material and a carbon steel (S45C) material were used as the materials to be bonded. The dimensions of the material to be bonded were both 65 mmL×15 mmW×3 mmT, and the 15 mmW×3 mmT surface was used as the surface to be bonded. The aluminum alloy (A7075-T6) material and the carbon steel (S45C) material are a combination having no temperature at which the strengths are the same.

As the insert material, a pure nickel material having dimensions of 30 mmL×15 mmW×3 mmT was used, and the 15 mmW×3 mmT surface was brought into contact with the aluminum alloy (A7075-T6) material and the carbon steel (S45C) material. The pure nickel material has temperatures at which the strength becomes the same as that of the aluminum alloy (A7075-T6) material and the carbon steel (S45C) material.

Figure 8:
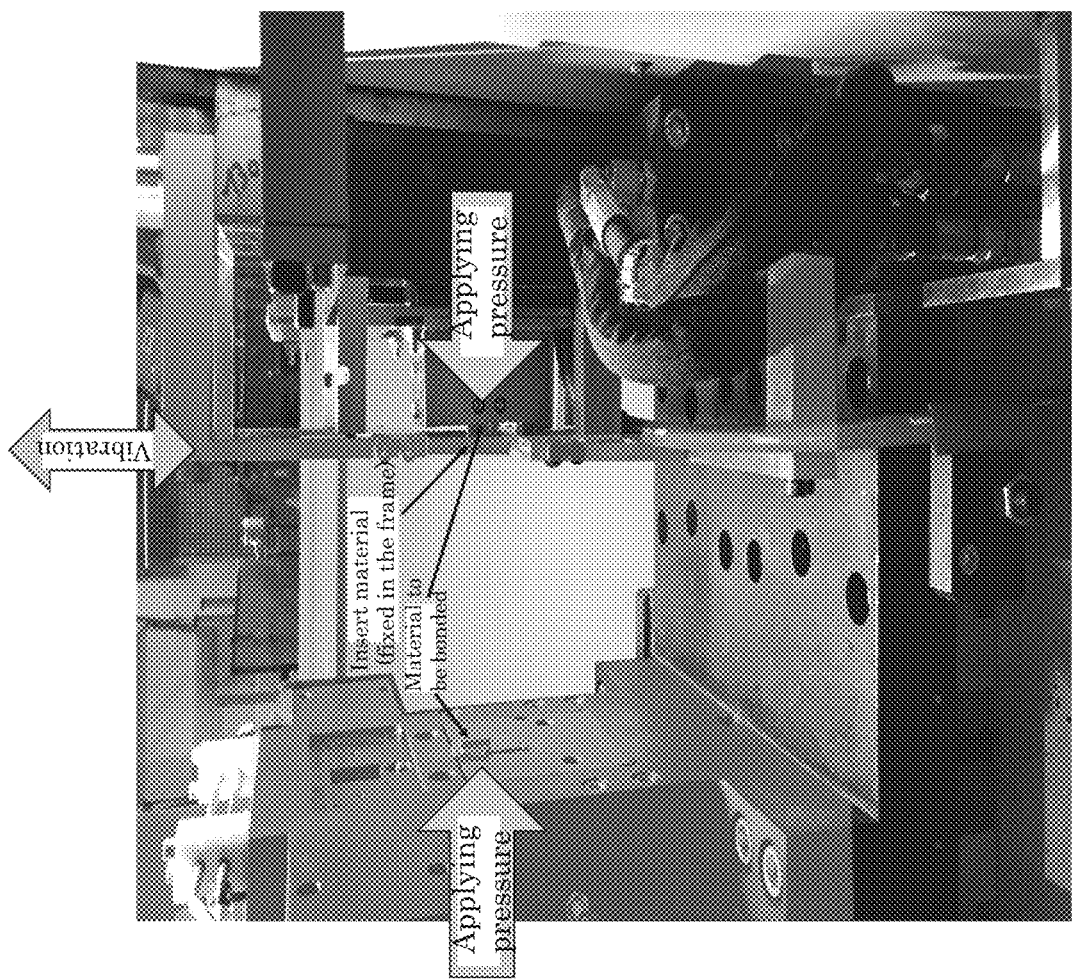
FIG. 8 is an external photograph of the dissimilar material solid phase bonding device used in Example.

By the dissimilar material solid phase bonding device using the principle of linear friction bonding shown in FIG. 8, the dissimilar material solid phase bonding was achieved by sliding the pure nickel material in the state that the bonding pressures were applied to the interface of the aluminum alloy material/pure nickel material and the interface of the carbon steel material/pure nickel material, respectively. Here, the bonding pressures were appropriately set in the range of 50 to 300 MPa so that the bonding pressures had different values at the interface of the aluminum alloy material/pure nickel material and the interface of the carbon steel material/pure nickel material, and the amplitude was 1 mm, the frequency was 25 Hz, and the burn-off length was 4 mm or 5 mm.

Figure 9:
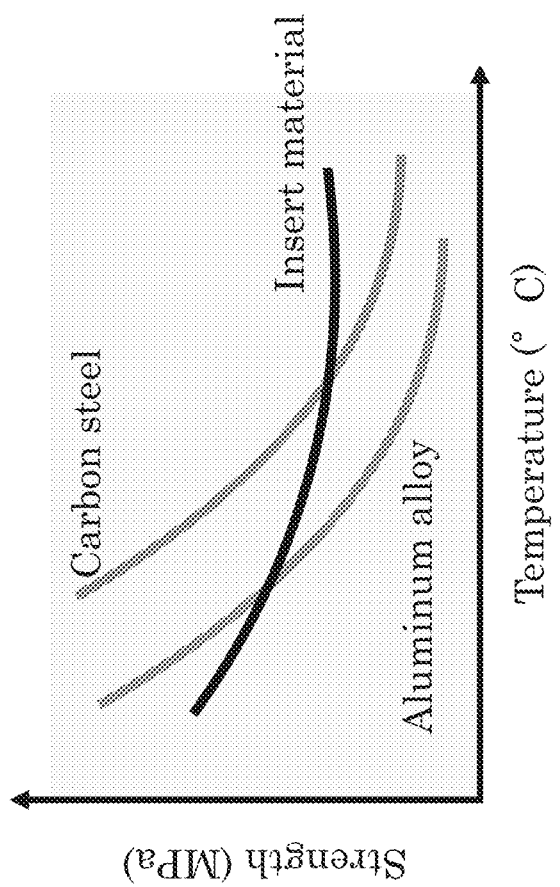
FIG. 9 is a schematic diagram which shows the temperature dependence of the strengths of the material to be bonded and the insert material used in Example.

FIG. 9 schematically shows the temperature dependence of the strengths of the aluminum alloy (A7075-T6) material, the carbon steel (S45C) material, and the pure nickel material. The temperature at which the strengths of the aluminum alloy (A7075-T6) material and the pure nickel material are the same is lower than the temperature at which the strengths of the carbon steel (S45C) material and the pure nickel material are the same. This relationship means that it is necessary to set the bonding pressure applied to the interface of the aluminum alloy material/pure nickel material to a higher value than the bonding pressure applied to the interface of the carbon steel material/pure nickel material.

As a result of studying the bonding pressure from the relationship shown in FIG. 9, when the bonding pressure applied to the interface of the aluminum alloy material/pure nickel material is 200 MPa and the bonding pressure applied to the interface of the carbon steel material/pure nickel material is 50 MPa, a good dissimilar material solid phase bonded joint was obtained where at the interface of the aluminum alloy material/pure nickel material, both the aluminum alloy material and the pure nickel material were deformed, and at the interface of the carbon steel material/pure nickel material, both the carbon steel material and the pure nickel material were deformed. In the dissimilar material solid phase bonded joint, an external photograph in the vicinity of the interface of the aluminum alloy material/pure nickel material is shown in FIG. 10, and an external photograph in the vicinity of the interface of the carbon steel material/pure nickel material is shown in FIG. 11, respectively.

Figure 11:
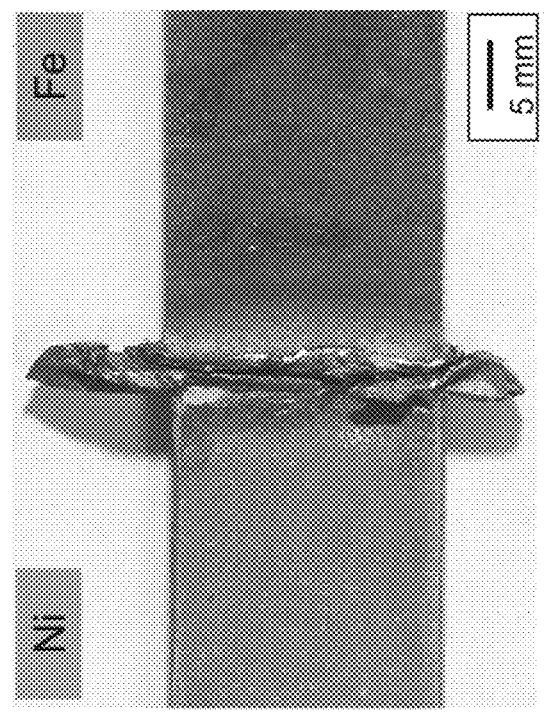
FIG. 11 is an external photograph in the vicinity of the interface of carbon steel material/pure nickel material.
Figure 10:
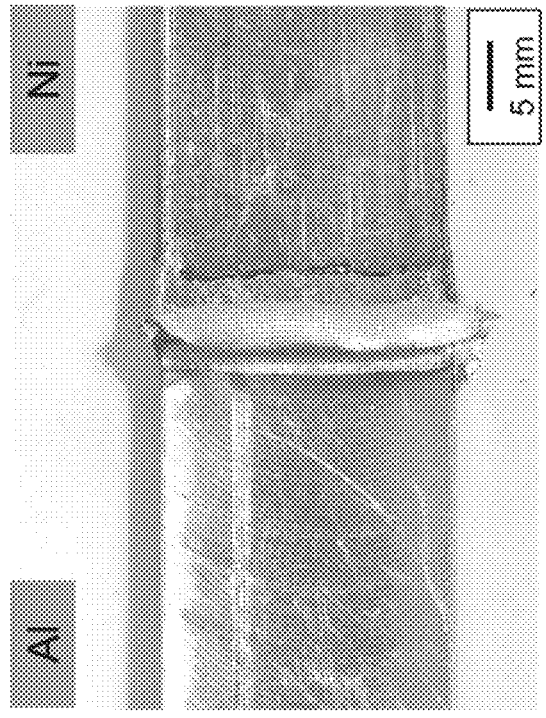
FIG. 10 is an external photograph in the vicinity of the interface of aluminum alloy material/pure nickel material.

From FIG. 10 and FIG. 11, it can be seen that both the aluminum alloy material and the pure nickel material are deformed at the interface of the aluminum alloy material/pure nickel material, and the carbon steel material and the pure nickel material are both deformed at the interface of the carbon steel material/pure nickel material. The difference in the state of deformation (discharge of relatively thin burrs and deformation of the plate material itself) is due to the difference in temperature dependence of the strength and thermal conductivity of the material to be bonded, but considering the discharge of burrs and/or the area of the new surfaces formed by the deformation in the vicinity of the interface to be bonded, the bonding conditions may be set so that the new surfaces are in contact with each other. Here, the burn-off length at the interface of the aluminum alloy/pure nickel is 5 mm, and the burn-off length at the interface of the carbon steel/pure nickel is 4 mm.

Figure 12:
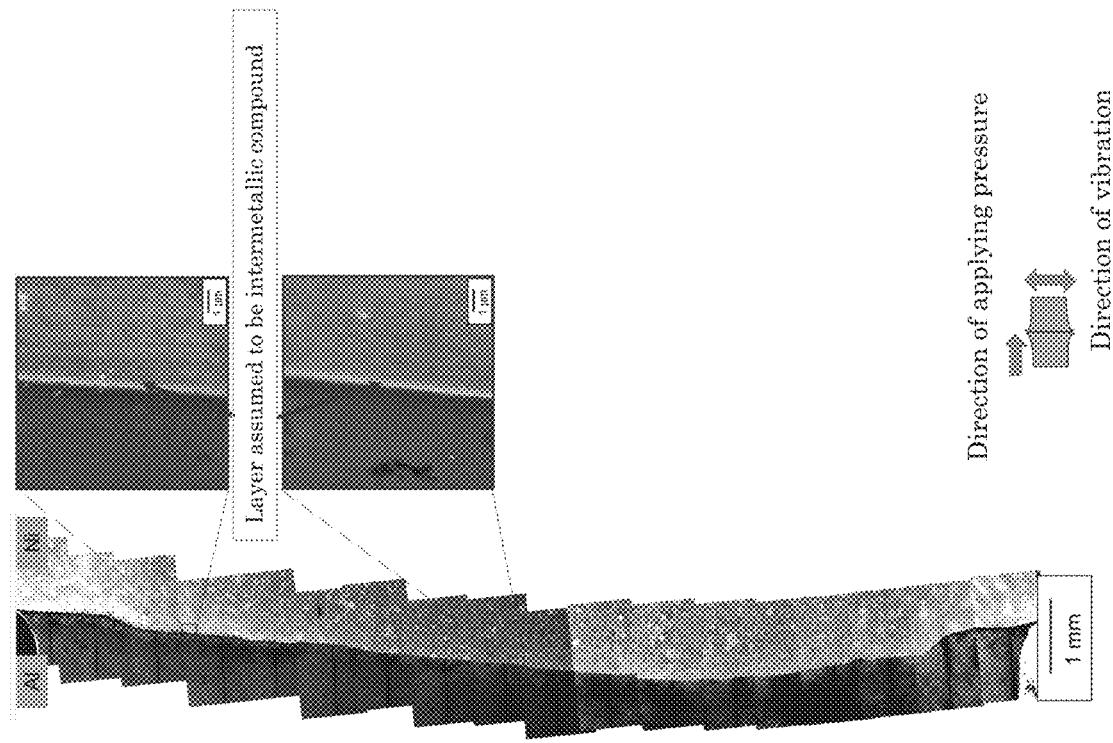
FIG. 12 is an SEM photograph of the interface of an aluminum alloy material/pure nickel material.
Figure 13:
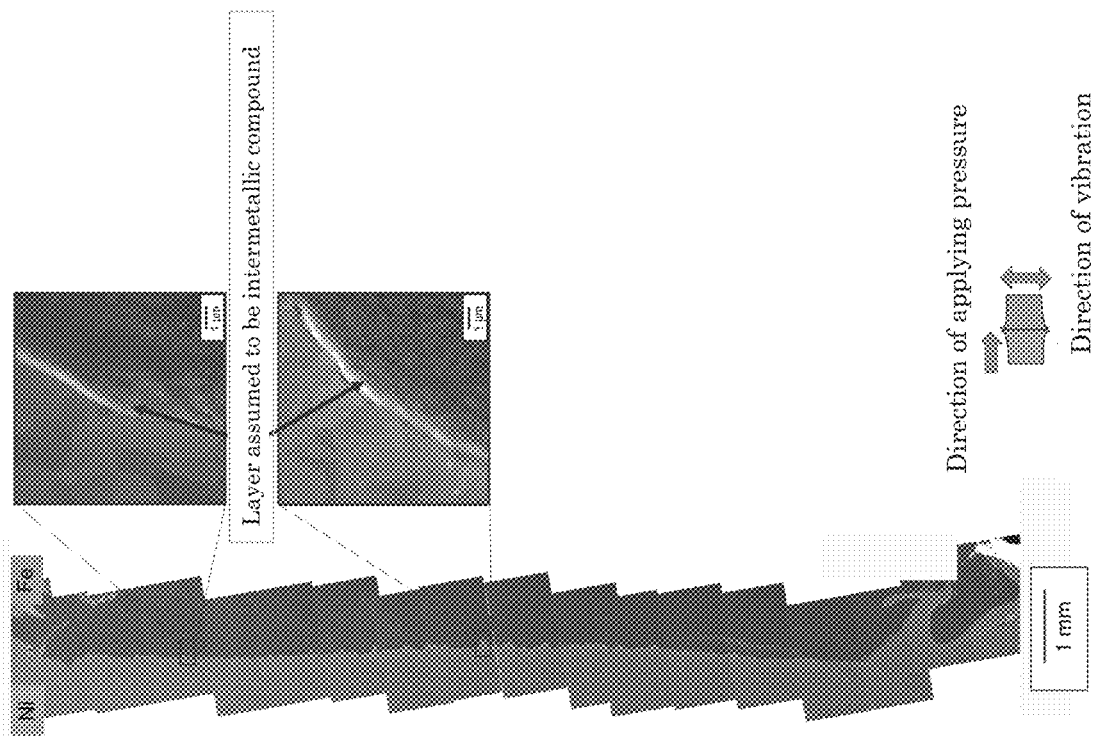
FIG. 13 is an SEM photograph of the interface of a carbon steel material/pure nickel material.

The cross-sectional sample ("bonding pressure application direction-sliding direction" plane) was prepared for the obtained dissimilar material solid phase bonded joint, and the scanning electron microscope observation (SEM observation) of the interface of the aluminum alloy material/pure nickel material and the interface of the carbon steel material/pure nickel material was performed. An SEM photograph of the interface of the aluminum alloy material/pure nickel material is shown in FIG. 12, and an SEM photograph of the interface of the carbon steel material/pure nickel material is shown in FIG. 13, respectively.

A good bonded interface without defect is formed in the entire area of the interface of the aluminum alloy material/pure nickel material and the interface of the carbon steel material/pure nickel material. Further, although there is a region that seems to be an intermetallic compound layer, the film thickness is extremely thin (less than 1 µm), and there is also a region that cannot be clearly observed.

From the above results, according to the dissimilar material solid phase bonding method of the present invention, the aluminum alloy material and the pure nickel material are both deformed at the interface of the aluminum alloy material/pure nickel material and the carbon steel material, and the carbon steel material/pure nickel material are both deformed at the interface of the carbon steel material/pure nickel material to give a good dissimilar material solid phase bonded joint by the contact between the new surfaces, and it was confirmed that, over the entire area of the bonded interface, the state without defect where an extremely thin intermetallic compound layer was formed was realized.

Example 2

A titanium alloy (Ti6Al4V) material and a carbon steel (S45C) material were used as the materials to be bonded. The dimensions of the material to be bonded were both 65 mmL×25 mmW×5 mmT, and the 25 mmW×5 mmT surface was used as the surface to be bonded. As the insert material, a stainless steel (SUS304) material having dimensions of 30 mmL×25 mmW×5 mmT was used, and the 25 mmW×5 mmT surface was brought into contact with the titanium alloy (Ti6Al4V) material and the carbon steel (S45C) material.

In the same manner as in Example 1, by the dissimilar material solid phase bonding device using the principle of linear friction bonding shown in FIG. 8, the dissimilar material solid phase bonding was achieved by sliding the stainless steel material in the state that the bonding pressures were applied to the interface of the titanium alloy material/stainless steel material and the interface of the carbon steel material/stainless steel material, respectively. Here, the bonding pressures were appropriately set in the range of 50 to 400 MPa so that the bonding pressures had different values at the interface of the titanium alloy material/stainless steel material and the interface of the carbon steel material/stainless steel material, and the amplitude was 1 mm, the frequency was 25 Hz, and the burn-off length was 4 mm or 5 mm.

Figure 14:
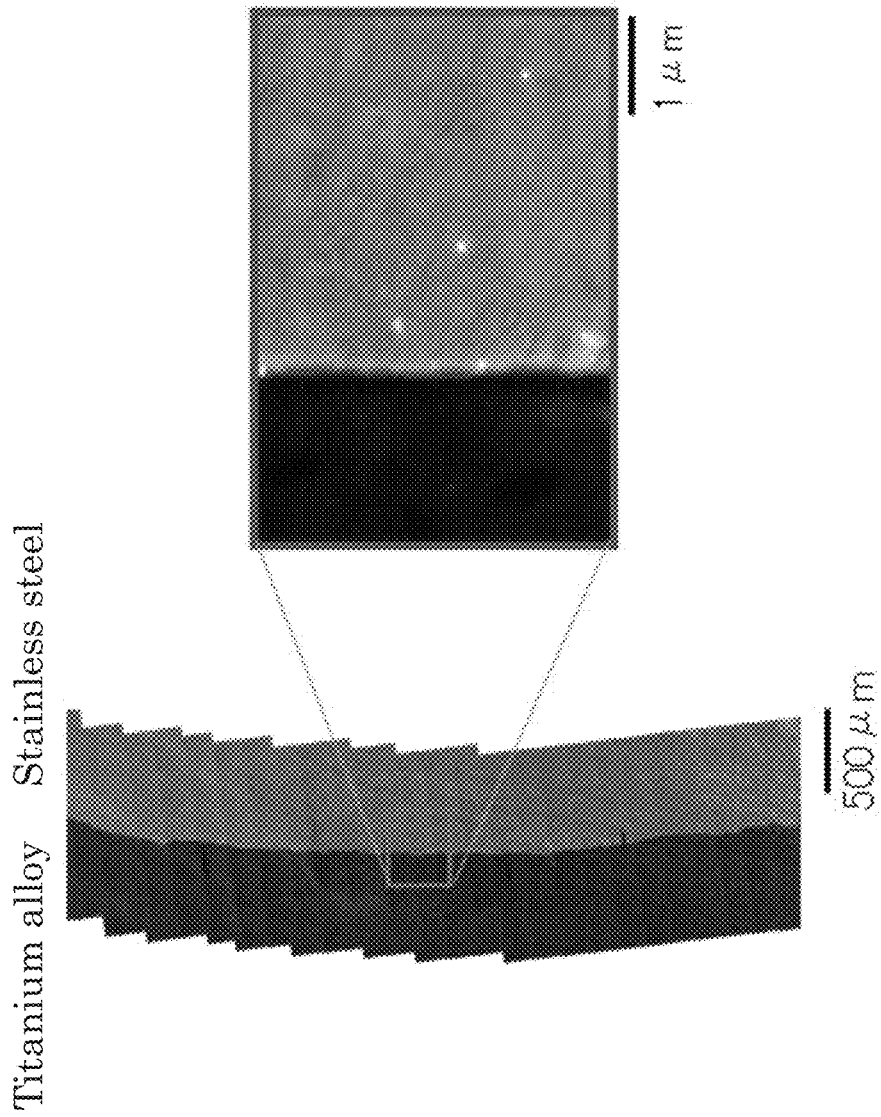
FIG. 14 is an SEM photograph of the bonded interface of a titanium alloy material/stainless steel material.

Focusing on the interface of the titanium alloy material/stainless steel material, when the applied pressure at the time of bonding was 400 MPa, both the titanium alloy material and the stainless steel material were deformed, and a good solid phase bonded portion was formed. An SEM photograph of the cross section of the bonded interface of the obtained titanium alloy material/stainless steel material is shown in FIG. 14.

A good bonded interface without defect is formed in the entire area of the interface of the titanium alloy material/stainless steel material. Further, although there is a region that seems to be an intermetallic compound layer, the film thickness is extremely thin (less than 1 µm), and there is also a region that cannot be clearly observed.

Figure 15:
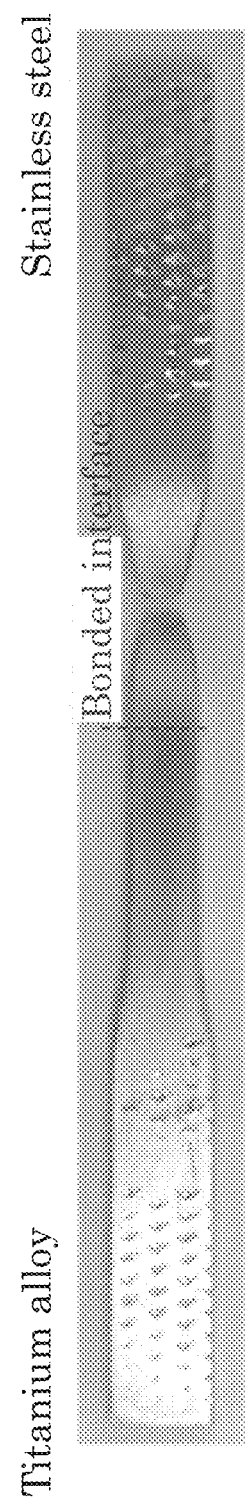
FIG. 15 is an external photograph of the tensile test piece after the tensile test.

A tensile test piece was cut out so that the obtained bonded interface of the titanium alloy material/stainless steel material was at the center of the parallel portion, and a tensile test was performed. The size of the parallel portion of the tensile test piece was 5 mm in plate thickness, 6 mm in width, and 25 mm in length. When a tensile test was performed using the tensile test piece, it was found that the stainless steel material side was broken as shown in FIG. 15 and it can be seen that the extremely good bonded portion was formed.

EXPLANATION OF SYMBOLS

2 . . . One member,
4 . . . Other member,
6 . . . Insert material,
8 . . . Burr,
10 . . . Interface to be bonded,
20 . . . Dissimilar material bonded structure,
22, 24 . . . Solid phase bonded interface.

The invention claimed is:

1. A dissimilar material solid phase bonding method which is a solid phase bonding method for bonding one member and other member, characterized in that:
   the one member and the other member have different compositions;
   the one member and the other member are brought into contact with one another by way of an insert material to form a first interface to be bonded, at which the one member and the insert material are in contact with one another, and a second interface to be bonded, at which the other member and the insert material are in contact with one another;
   the temperature of the first interface to be bonded and the second interface to be bonded is raised by means of frictional heat due to sliding between the one member and the insert material and between the other member and the insert material, and/or by electrical heating;
   a first bonding pressure is applied substantially perpendicular to the first interface to be bonded;
   a second bonding pressure is applied substantially perpendicular to the second interface to be bonded; and
   the first bonding pressure and the second bonding pressure are set to different values,
   wherein the first bonding pressure is set to a value equal to or higher than a yield stress and equal to or lower than a tensile strength of the insert material and the one member at the first temperature, and
   the second bonding pressure is set to a value equal to or higher than a yield strength and equal to or lower than a tensile strength of the insert material and the other member at the second temperature.

2. The dissimilar material solid phase bonding method according to claim 1, wherein
   there is a first temperature at which the insert material and the one member have substantially a same strength,
   there is a second temperature at which the insert material and the other member have substantially a same strength, and
   the first temperature and the second temperature have different values.

3. The dissimilar material solid phase bonding method according to claim 1, wherein the frictional heat is generated by linear movement or rotation of the insert material.

4. The dissimilar material solid phase bonding method according to claim 1, wherein
the one member is an aluminum alloy member and
the other member is an iron-based metal member, a copper-based metal member, or a titanium-based member.

* * * * *